J. SMITH.

Seed Dropper.

No. { 61, 1,166. }

Reissued Apr. 2, 1861

Witnesses.
Geo. W. Adams
Montgomery Noble

Inventor.
Jonathan Smith

N. PETERS, PHOTO-LITHOGRAPHER, WASHINGTON, D. C.

UNITED STATES PATENT OFFICE.

JONATHAN SMITH, OF TIFFIN, OHIO.

IMPROVEMENT IN SEED-DRILLS.

Specification forming part of Letters Patent No. 27,162, dated February 14, 1860; Reissue No. 1,166, dated April 2, 1861.

*To all whom it may concern:*

Be it known that I, JONATHAN SMITH, of Tiffin, in the county of Seneca and State of Ohio, have invented a new and useful Improvement in Seed-Drills; and I do hereby declare that the following is a full, clear, and exact description of the same, reference being had to the annexed drawings, forming part of this specification, in the several figures of which similar characters of reference denote the same parts.

Figure 4:
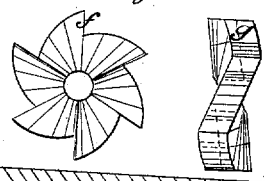
Figure 5:
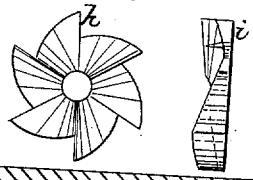
Figure 2:
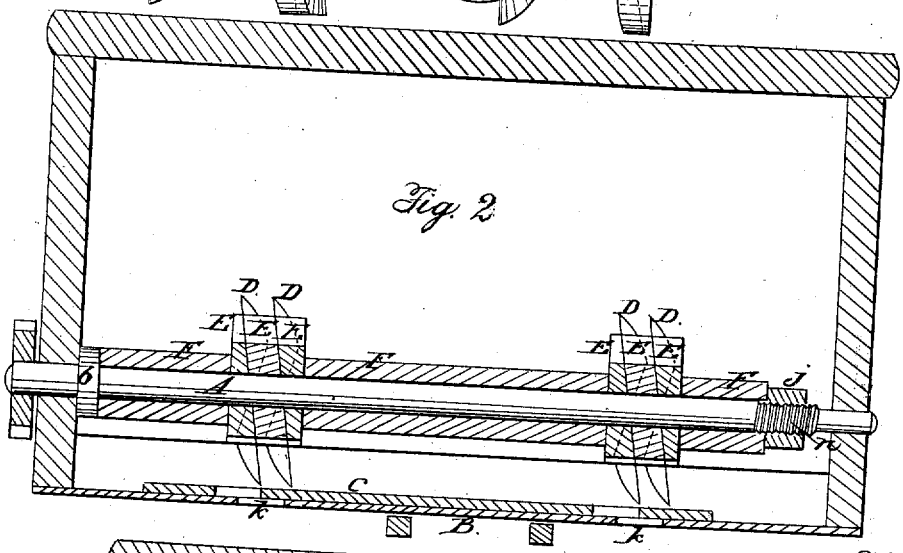
Figure 1:
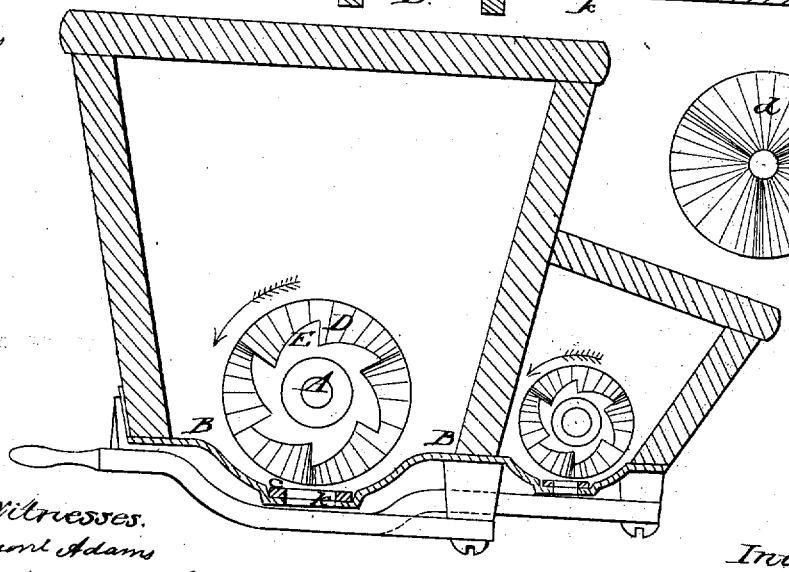
Figure 3:
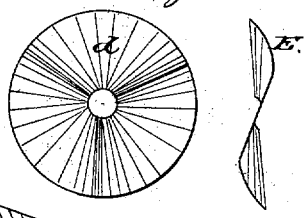

Figure 1 is a vertical transverse section of seed-box and agitating apparatus. Fig. 2 is a vertical longitudinal section of same. Fig. 3 shows the thin corrugated plate detached. Fig. 4 shows the center ratchet-washer detached. Fig. 5 shows a side ratchet-washer detached.

The invention here considered has reference to the mechanism for discharging the seed to the spouts, and is designed to obviate the intermittent action common to other agitators, so that a continuous flow of grain shall pass to the discharge-openings during the entire operation of the machine.

The character of agitator employed consists of thin metal plates upon a rotary longitudinal shaft, which plates are corrugated or crimped, so as to form inclined surfaces to act upon the grain when rotated, and by the agitation thus imparted cause a flow through the discharge-openings. But as this lateral movement of the grain by the plates is alternate, there is a cessation of motion at the moment of change, and since the machine moves forward a certain distance during this interval, there is necessarily an unsown space. The invention is to obviate this defect; and it consists in the employment of inclined surfaces to press directly upon the grain at the cessation of agitation by the plates, so as to force the necessary quantity of seed through the discharge-opening during the interval above mentioned, and thus insure a continuous flow of seed. The details of construction and operation will readily be understood from the following description and reference to the drawings.

The seed box or hopper is constructed in the ordinary manner, with the exception of the bottom B, which is made concave and of greater radius than that of the corrugated agitating-wheels D D, for the purpose of bringing the edges of said wheels nearest the bottom directly over the feed-slide, the form of the bottom favoring the inclination of the grain to settle at its lowest portion. In the center of this bottom, which is made of metal, is a recess for the feed-slide *c*, an indicator being attached to the slide in the ordinary manner.

The agitators are constructed and arranged as follows: A rod, A, in proper bearings extends through the seed-box, one end projecting to receive the ordinary driving-pinion. Upon this rod, over each discharge-opening, are secured in pairs the circular corrugated plates D, with the ratchet-washers E. The manner of attaching these agitators may be varied in many respects, as their action is not dependent thereon.

The following is the mode of attachment shown in the drawings: A fixed collar, *b*, is secured to rod A within the hopper. A loose collar of suitable length, as seen at F, is next placed upon the rod, then a side ratchet-washer, (seen at *h i*, Fig. 5, and at E, Fig. 1,) and next thereto one of the corrugated or crimped thin metallic plates seen at *d e*, Fig. 3. Then follows the center washer, E. (Seen at *f g*, Fig. 4,) then another corrugated plate, followed by a second side washer, making the agitator complete for a single discharge-hole. A second collar, F, of sufficient length to admit of the construction of the next agitator over the next discharge-opening, is then placed upon the rod, and the above-described arrangement repeated until each opening is provided with an agitator. The whole system is then firmly united by means of the nut *j* upon the thread *n* of rod A, as seen in Fig. 2. The center corrugated ratchet-washer is of such thickness that by the revolution of rod A the corrugated wheels D will give a zigzag motion from one end of the discharge-opening *k* to the other, the side corrugations of this washer conforming to the corrugations of wheels D. The thin metallic wheels pass readily through the grain without mashing it or catching any foreign substance that may be present, and thus clogging the machine. Moreover, these thin plates do not cover any material portion of the hole *k*, and prevent the full discharge of the grain, as is the case with thicker agitators.

The operation of this construction is as follows: The corrugated wheels give a zigzag motion to the grain over the discharge-hole, while the ratchet-edges of the washers have a tendency to force the grain downward, at the same time facilitating the lateral motion given by the wheels D, the form of the bottom B being such as to convey the seed within the action of the agitators.

It will be observed that the portion of the ratchet-washer nearest the bottom is situated at the angle of the corrugation or crimp of the wheels D, so that the greatest pressure is exerted by the washer at the time when the lateral agitation of the seed ceases. This pressure therefore forces the seed through the opening to the spouts at the time the wheels alone would be inoperative, thereby rendering the discharge continuous.

Having described my invention and the operation thereof, I claim—

1. Producing a direct downward pressure on the grain by the ratchet-washer when its lateral agitation by the corrugated plates is suspended to insure a continuous flow of grain, substantially in the manner described.

2. The thin metal corrugated wheels D, and ratchet-washers E conforming therewith in lateral surface, in combination with shaft A, collars F, and concave hopper-bottom B, the operation being as set forth.

In testimony whereof I have hereunto signed my name before two subscribing witnesses.

JONA. SMITH.

Witnesses:

GEO. PATTEN,

JOHN S. HOLLINGSHEAD.